United States Patent [19]

Pippert

[11] Patent Number: 4,573,283

[45] Date of Patent: Mar. 4, 1986

[54] FISHING LURE

[75] Inventor: Aaron J. Pippert, Houston, Tex.

[73] Assignee: Utex Industries, Inc., Houston, Tex.

[21] Appl. No.: 462,057

[22] Filed: Jan. 28, 1983

Related U.S. Application Data

[63] Continuation-in-part of Ser. No. 186,411, Sep. 12, 1980, abandoned.

[51] Int. Cl.[4] ............................................. A01K 85/00
[52] U.S. Cl. ................................. 43/42.09; 43/42.24; 43/42.39
[58] Field of Search .................. 43/42.09, 42.22, 42.24, 43/42.38, 42.49

[56] References Cited

U.S. PATENT DOCUMENTS

| | | | |
|---|---|---|---|
| 3,203,132 | 8/1965 | Kotis | 43/42.24 |
| 3,289,345 | 12/1966 | Reininger et al. | 43/42.09 |
| 4,211,027 | 7/1980 | Viscardi | 43/42.24 |
| 4,307,531 | 12/1981 | Honse | 43/42.24 |

FOREIGN PATENT DOCUMENTS

| | | | |
|---|---|---|---|
| 15047 | 8/1906 | Norway | 43/42.38 |
| 54891 | 2/1935 | Norway | 43/42.38 |
| 81897 | 6/1953 | Norway | 43/42.38 |

Primary Examiner—Nicholas P. Godici
Assistant Examiner—Kurt Rowan
Attorney, Agent, or Firm—Browning, Bushman, Zamecki & Anderson

[57] ABSTRACT

A fishing lure comprises a flexible lure body having a preformed cavity therein. The cavity has a leading end and a trailing end, and the lure body has an insert opening through the exterior thereof into the cavity. An insert mounted in the cavity is selectively removable therefrom through the insert opening. The insert has a leading end disposed adjacent the leading end of the cavity and a trailing end disposed adjacent the trailing end of the cavity. The insert is either preformed with or forcibly malleable to assume a configuration differing from that assumed by the cavity in a relaxed condition without said insert therein. The insertion of the insert into the cavity will thus cause deflection of the lure body in a direction from the leading end to the trailing end and alter the external configuration of the lure body.

13 Claims, 11 Drawing Figures

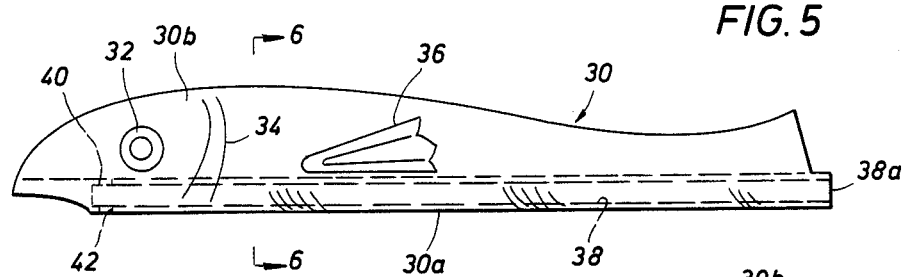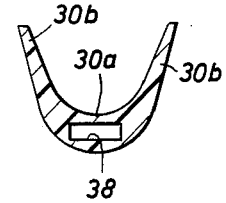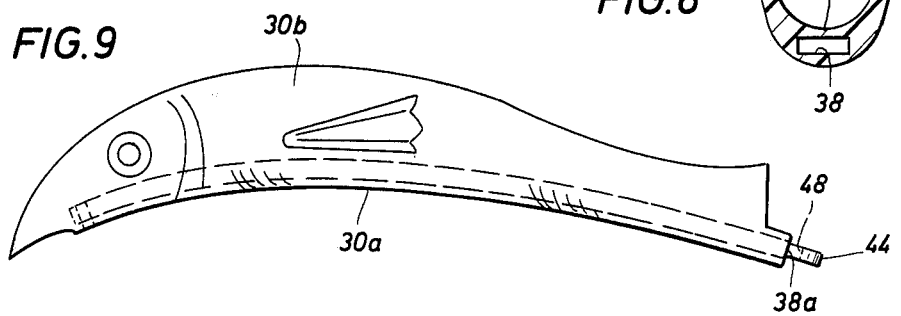

FISHING LURE

CROSS REFERENCE TO RELATED APPLICATION

This is a continuation-in-part of application Ser. No. 186,411 filed Sept. 12, 1980 now abandoned.

BACKGROUND OF THE INVENTION

1. Field of the Invention

The present invention pertains to fishing lures. In the past, most lures have been made either of metal or of a rubber-like or plastic material. Rubber-like and/or plastic materials are preferred by many fisherman because of the versatility they offer in providing many different types of lures and lures which more nearly resemble the natural prey of various fish. For example, the formation of lures from plastic materials not only permits the use of many different colors for various lures, but also permits the production of individual lures having different colors on different parts thereof. These effects can be achieved either by properly coloring the plastic material from which the lure is to be formed and/or by painting the exterior of the lure body, but would be more difficult if the lure body were comprised of metal. Furthermore, because molded plastic bodies having intricate configurations can be produced much more cheaply than like bodies of metal, it becomes practicable, with the use of plastics, to form lure bodies whose external configurations fairly accurately represent those of a small fish, worm, shrimp, or other natural prey. By way of comparison, metal lures are more typically produced in fairly simple shapes, such as that commonly known as a "spoon." Likewise, the use of various plastics permits different lure bodies to be formed with varying degrees of other qualities such as translucence, fluorescence, etc.

Although plastic lures have numerous advantages described above, they also have several drawbacks. One of these is that they are often too light in weight to provide the desired action as they are played in the water. Another is that, with the fish hook attached to one end or side of the lure body and the line attached to the other, the lure body may break or tear away in use due to the relative weakness of the material of which it is formed. This is particularly true of the relatively soft or flexible plastics or other rubber-like materials commonly used in the manufacture of shrimp or worm type lures. For these reasons, many fishermen continue to use metal lures for the sake of their greater weight and strength.

Still another disadvantage with any conventional lure, regardless of the material of which it is formed, is that its weight and configuration are fixed. Accordingly, a fisherman wishing to have the capability of varying the lure weight, appearance or action must carry a relatively large assortment of separate lures. Additionally, since each of these lures has one or more hooks, they tend to become entangled. Furthermore, as previously mentioned, the plastic lures may be relatively light and are therefore limited to relatively large sizes, since a relatively small lure formed entirely of plastic would be unduly light in weight. Conversely, with many of the preferred metal materials, the lure body may be limited to a relatively small range of sizes, since larger lures formed of such metals would be entirely too heavy.

2. Description of the Prior Art

Various schemes have been devised for dealing with the above problems. However, in general, these have dealt with only one or another of the aforementioned disadvantages, and have failed to address others, and/or have introduced new problems of their own. For example, U.S. Pat. Nos. 2,708,806 to Siebert, 2,787,075 to Baum and 3,395,480 to McPherson disclose lures having upper and lower layers formed of different materials. Such lures attempt to combine various qualities of metal and plastic, such materials being used in the different layers respectively. However, the means by which these layers are joined to each other render these lures relatively expensive. Furthermore, the weight, appearance, and action of each such lure are still fixed or unchangeable.

U.S. Pat. No. 3,305,964 to Wieszeck discloses a plastic lure body having metal members embedded therein. While such a structure may have increased weight and/or strength, as compared with lures formed of plastic only, it is likewise relatively expensive to manufacture, and its features are fixed.

U.S. Pat. No. 3,289,345 to Reininger et al discloses a sleeve which can be emplaced over a conventional spoon type lure to compensate for wearing of the finish on the exterior of the lure and/or to change its color. However, in this structure, the sleeve is a relatively thin-walled cover which simply parallels the general external configuration of an already existing lure body. Thus, such configuration, as well as the weight of the lure, are pre-determined and generally fixed by such existing lure.

French Pat. No. 1,509,103 to Masson, U.S. Pat. Nos. 3,108,390 to Knight, 4,266,360 to Smith, 3,490,165 to Thomassin, and 3,971,152 to Husson, Jr. all disclosed multi-part lures in which an insert or other separable part is interfitted with a lure body. However, all of these arrangements still suffer from lack of versatility in that there is no provisions for altering the configuration of the lure body and/or its action as it is played in the water. Rather, the external configuration, whether rigid or flexible, is essentially fixed and unalterable.

SUMMARY OF THE INVENTION

The present invention provides a high degree of versatility with a flexible lure body having a preformed cavity therein, the cavity having a leading end and a trailing end. An insert opening extends through the exterior of the lure body into the cavity. An insert is selectively mountable in and removable from the cavity through the insert opening, the insert--like the cavity---having leading and trailing ends. The insert may either be preformed to a configuration differing from that assumed by the cavity in a relaxed condition (without the insert therein) and/or may be manually malleable to such configuration. In any event, the presence of the insert in the cavity will cause deflection of the lure body in a direction from the leading end to the trailing end and alter the external configuration of the lure body.

By utilizing various inserts, and/or by bending the inserts to various configurations, the user can achieve a number of different lure configurations with only a single lure body. This not only alters the external appearance of the lure, but will also alter its action in the water.

Another advantage is that the present invention provides for a highly sophisticated or intricate lure configuration without unduly onerous or expensive manufacturing procedures. For example, the lure body can be molded from a suitable plastic or the like, and a mold part will occupy the space to form the cavity during the molding process. To permit easy removal of this mold part after molding, the cavity must, as a practical matter, be designed with a fairly simple geometry, and in particular, must be substantially straight in its major lengthwise direction. The insert, on the other hand, typically formed of a more rigid material than the lure body, which material is nevertheless malleable, e.g. a suitable metal, may be cheaply pre-formed or bent by the user to a non-rectilinear, i.e. curved or angular, configuration, along its length. Then, when the insert is emplaced in the lure body cavity, a fairly sophisticated configuration is achieved by virtue of the consequent deflection of the lure body, although the lure body itself and its insert may be, individually, relatively simple in configuration. Furthermore, by changing inserts and/or by bending one insert, the user may achieve any number of such fairly sophisticated or intricate configurations with the same basic lure body.

More specifically, the lure body may include a central portion defining the cavity and a plurality of appendages extending from the central portion, with the insert serving to cause not only deflection of the central portion but also flexing of the appendages.

As mentioned, the lure body is preferably formed of a suitable plastic or similar material. Thus, even in its relaxed condition, without the insert, it can be provided with a more realistic external configuration than plain metal lure bodies. Then, by insertion of an insert in accord with the present invention, the external configuration, and consequently the action of the lure in the water, can be even further modified and sophisticated.

At the same time, the insert can be used to add weight to the lure as a whole and by utilizing inserts of different weights, the action of the lure in the water can be modified in still another way. Additionally, the insert preferably comprises a means defining an eyelet generally adjacent its leading end and means for carrying at least one fish hook adjacent its trailing end. Thus, because the line may be attached to the eyelet on the insert, and the fish hook is also carried by the insert, forces exerted on the lure in use are borne primarily by the insert, rather than by the lure body. The insert, or at least the portion thereof carrying the hook and line, is, as mentioned, preferably formed of a relatively strong material such as metal. Thus, there is little chance of the lure body tearing away in use, even though it may be formed of a relatively soft and flexible material.

In addition, even if one such insert basically parallels the unflexed configuration of the cavity, that insert---being sufficiently rigid to resist deformation in normal use--will support the relatively flexible lure body in a desired, e.g. straight line, configuration. This can also help to restore a desired configuration to a lure body which has become deformed by crushing between other objects in the tackle box, heat, etc.

Lures according to the present invention may be provided in kits, each kit including at least one lure body and a plurality of inserts. The inserts may be of varying configurations and/or weights in order to permit the lure to be altered as described above. Such a kit could also be provided with a plurality of lure bodies interchangeable on the various inserts. Where such lure bodies are provided with different appearances, e.g. variations in color, shape, flexibility, etc., even greater versatility is provided with relatively few distinct parts.

Accordingly, it is a principal object of the present invention to provide an improved fishing lure.

Another object of the present invention is to provide a flexible lure body with a removable insert for altering the external configuration of the lure body.

Still another object of the present invention is to provide a fishing lure kit including a plurality of such inserts interchangeable on at least one lure body.

Still other objects, features, and advantages of the present invention will be made apparent by the following detailed description, the drawings, and the claims.

BRIEF DESCRIPTION OF THE DRAWINGS

FIG. 5 is a side elevational view of a lure body according to a second embodiment of the invention.

FIG. 6 is a transverse cross-sectional view taken along the line 6—6 in FIG. 5.

FIG. 7 is a side elevational view of a first insert for use with the lure body of FIGS. 5 and 6.

FIG. 8 is a plan view of the insert of FIG. 7.

FIG. 9 is a side elevational view of the lure body of FIGS. 5 and 6 with the insert of FIGS. 7 and 8 therein.

FIGS. 10 and 11 are side elevational views of alternate inserts for use with the lure body of FIGS. 5 and 6.

DESCRIPTION OF THE PREFERRED EMBODIMENTS

Figure 1:
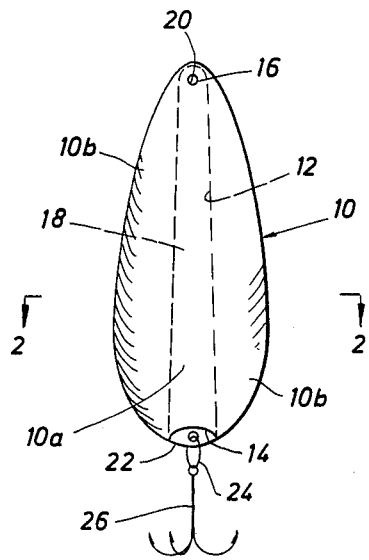
FIG. 1 is a plan view of a first embodiment of lure according to the present invention.
Figure 2:
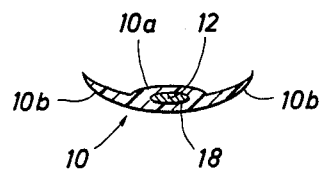
FIG. 2 is a transverse cross-sectional view taken along the line 2—2 in FIG. 1.
Figure 3:
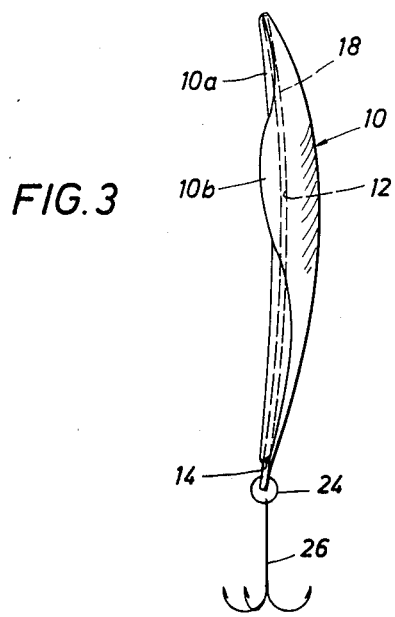
FIG. 3 is a side elevational view taken along the line 3—3 in FIG. 1.

Referring now to FIGS. 1-3, there is shown a first embodiment of the present invention. The lure of FIGS. 1-3 includes a lure body 10 molded of a relatively flexible or rubber-like resin or plastic. The outer surfaces of body 10 define the overall external size and general configurational type of the lure as a whole. In the embodiment shown, the configuration type thus defined by body 10 is generally that of a modified spoon. More specifically, when viewed in plan as in FIG. 1, such configuration includes a generally ovoid profile. As best seen in FIG. 2, the external configuration of body 10 further includes a thickened central rib portion 10a extending along the length of body 10 and a pair of flap-like appendages 10b extending lengthwise along opposite sides of rib portion 10a. Appendages 10b are directed laterally outwardly from rib 10a in opposite directions. Also as shown in FIG. 2, the surfaces defining appendages 10b are concave along the upper face of body 10, and convex and continuous with the adjoining surface of rib portion 10a along the lower face of body 10.

Body 10 further includes inner surfaces defining a cavity 12 extending generally lengthwise through body 10. Cavity 12 is substantially smaller than the external size of body 10 and of substantially different configuration than the external configuration of body 10. More specifically, cavity 12 has a simple elliptical transverse cross-sectional configuration and is substantially straight in the lengthwise direction (in a relaxed condition without insert 18 therein). The width of cavity 12, as shown in FIG. 1, is smoothly tapered or graduated along its length. As shown in FIG. 3, the depth of cavity 12 is generally uniform.

The wide end of cavity 12 is the trailing end thereof, and the narrow end is its leading end. Since cavity 12 extends lengthwise through body 10, the leading and trailing ends of the cavity 12 correspond respectively to the front and rear ends of body 10. Body 10 has an insert opening 14 extending from its exterior endwise into the trailing end of cavity 12. Body 10 also has a pair of aligned access openings 16 extending transversely into the leading end of cavity 12.

The lure also includes an insert 18 formed of a relatively strong rigid metal. The insert 18 is removably mounted in cavity 12 by inserting it through insert opening 14. The length of insert 18 corresponds generally to that of cavity 12 as does its elliptical transverse cross-sectional configuration. The width and thickness of insert 18 are substantially equal to but slightly smaller than the corresponding dimensions of cavity 12 (the width of insert 18 being tapered from one end to the other to correspond to the taper of the cavity) so as to permit insertion of insert 18 into cavity 12 while still providing a relatively snug mating fit. However, while cavity 12, in a relaxed condition with insert 18 removed therefrom, would either be straight or limp when viewed from the side, insert 18 is slightly concave upwardly. Henceforth herein a cavity will be considered "straight" whether the lure body is sufficiently rigid to maintain a straight cavity configuration (in the absence of an insert) or if, while technically formed straight, it falls limp under its own weight.

Thus, when insert 18 is inserted into cavity 12, body 10 will flex in the direction from leading to trailing end to allow cavity 12 to follow the curvature of insert 18. More specifically, not only is there deflection of central portion 10a but also flexing of appendages 10b (see FIG. 3). Accordingly, while body 10 may be easily molded with relatively simple apparatus, including a straight mold piece for defining cavity 12, a fairly sophisticated configuration is ultimately achieved through the use of insert 18.

Insert 18 has a relatively narrow leading end received in the leading end of cavity 12. An eyelet 20 through said leading end of insert 18 is positioned for alignment with access openings 16 so that the fishing line can be passed through openings 16 and eyelet 20 for securing the lure to the line. Insert 18 also has an aperture 22 through its wide or trailing end for carrying a fishhook 26 via a small link ring 24 interconnecting hook 26 and aperture 22. As shown in FIG. 1, body 10 is cut away adjacent insert opening 14 to expose the rearmost portion of insert 18 in which aperture 22 is formed. This facilitates changing of hook 26 without disassembly of the lure.

Insert 18 adds desired weight to the plastic body 10 in which it is mounted while also adding support to the relatively flexible lure body along its central rib portion 10a. Furthermore, since the line and hook are engaged with insert 18, the major portion of the forces exerted on the lure in use are borne by the relatively strong insert 18, rather than by the relatively soft flexible body 10. Thus, there is little chance of body 10 tearing away in use. The snug fit of insert 18 in cavity 12, together with the mating tapers of insert 18 and cavity 12 laterally outwardly from their leading to their trailing ends, keeps the two members properly assembled as the lure is pulled through the water by its leading end. The two members, i.e. body 10 and insert 18, are further secured together by the line when it is passed through openings 16 and eyelet 20.

Figure 4:
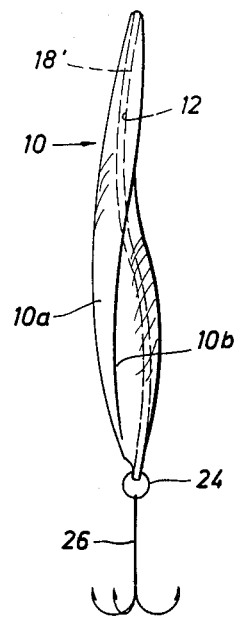
FIG. 4 is a view similar to that of FIG. 3 showing the lure body of FIGS. 1-3 with a different shaped insert.

Should the user desire to change the weight of the lure as a whole, this can be done by removing insert 18 from cavity 12 and replacing it with a similar insert having the same configuration but formed of lighter or heavier material(s) as needed. Due to the flexibility of body 10, interchangeable inserts can likewise be used to effect variations in the external configuration of the lure body. As previously mentioned, insert 18 is slightly concave upwardly. FIG. 4 shows a similar insert 18' having dimensions along its length, width, and thickness, substantially equal to those of insert 18, but differing in configuration in that it has a sigmoid curvature when viewed from the side. FIG. 4 illustrates the manner in which body 10 would flex to accommodate such curvature when insert 18' is inserted in cavity 12 and the difference in external appearance which would be obtained thereby. Such change of external configuration will also change the action of the lure in the water. The external appearance could further be altered by inverting insert 18 or 18' with respect to body 10, or by replacing body 10 with a similar body having a cavity sized to mate with insert 18 or 18' but differing in external appearance from body 10, e.g. in color or general external profile.

FIGS. 5-9 illustrate a second embodiment of the invention. FIGS. 5 and 6 show the flexible lure body 30 which includes a central portion 30a extending lengthwise along the major dimension of the lure body and a pair of flap-like appendages 30b extending lengthwise along opposite sides of central portion 30a and integral therewith. As best seen in FIG. 6, appendages 30b are directed generally tangentially with respect to central portion 30a (as compared to the laterally directed appendages 10b of the first embodiment) and in the same general direction, i.e. upwardly as viewed in the drawings. Although appendages 30b are generally parallel to each other, they may be flared slightly away from each other as shown in FIG. 6. When viewed from the side, as in FIG. 5, the appendages 30b, together with the adjacent central portion 30a, define the general configuration simulating a small fish. This simulation can be enhanced with features such as eyes 32, gills 34 and fins 36 molded into and/or painted on the outer sides of the lure body.

Lure body 30 has a cavity 38 extending lengthwise through central portion 30a. Cavity 38 has a fairly simple geometry, being straight in the lengthwise direction and having a generally rectangular cross-sectional configuration. The depth of recess 38 (measured in the vertical direction as shown in the drawings) is substantially uniform, while the width of the recess has a slight taper, similar to that of the preceding embodiment, the narrower end of the recess being forwardmost. Near the forward end of recess 38, central portion 30a has aligned bores 40 and 42 communicating with cavity 38 from above and below. The rear end of recess 38 opens through the lure body to provide an insert opening 38a.

FIGS. 7 and 8 show one metal insert 44 adapted for use with the lure body of FIGS. 5 and 6. It can be seen that the major lengthwise dimension of the lure body 30 corresponds to the direction from the leading to the trailing end of cavity 38. Insert 44 is similarly elongated and sized and shaped for receipt in cavity 38. More specifically, as shown in FIG. 7, insert 44 is of substantially uniform thickness, while as seen in FIG. 8, the width of insert 44 is tapered from a narrow leading end to a slightly wider trailing end. Insert 44 is not, however, straight in its lengthwise direction, as is cavity 38 in a relaxed condition, but rather is curved so as to be concave downwardly, as shown in FIG. 7.

Insert 44 is formed of a metal which is more rigid than the material of lure body 30 so that, when insert 44 is inserted in cavity 38, the lure body will be deflected as shown in FIG. 9. This not only causes the fairly simple molded body 30 to assume a more sophisticated configuration, but also determines the action of the lure in the water.

With the insert in place, a bore 46 in the leading end of insert 44 is aligned with bores 40 and 42 in the lure body to permit attachment of a fishing line to the lure. The trailing end of insert 44 has a bore 48 therethrough, and when the insert is in place as shown in FIG. 9, the trailing end of the insert protrudes through insert opening 38a to at least partially expose bore 48. Bore 48 is used for attachment of one or more fish hooks to the insert and may also be used to grip the insert for removal. As in the preceding embodiment, with the fishing line and fish hook or hooks being attached to opposite ends of the insert 44, the forces on the lure in use are borne primarily by the metal insert 44, whereby the softer lure body 30 is protected from tearing or similar damage.

FIGS. 10 and 11 show additional inserts which can be used with lure body 30 in place of insert 44. Each of these inserts will cause the lure body to be deflected in the direction from the leading to the trailing end in a different manner from that shown in FIG. 9, thereby altering the configuration of the lure body. In the insert 50 shown in FIG. 10, the leading end is curved downwardly, with the trailing end being substantially straight. Bores 52 and 54 are provided through the leading and trailing ends respectively for attachment of the fishing line and fish hook. The insert 56 shown in FIG. 11 has a straignt leading end with its trailing end deflected angularly downwardly. Again, bores 58 and 60 are provided for attachment of the fishing line and fish hook respectively.

For most fishermen, it is preferable that the various inserts for use with any given lure body be pre-formed to the appropriate configuration for determining a given type action of the lure in the water. However, some users prefer to be able to adjust the nature and degree of deflection on their own. For this purpose, one or more of the inserts can be made of a metal which, while significantly more rigid than the material of the lure body, is forcibly manually malleable, either before or after insertion into the lure body. Various steels and steel alloys are suitable.

In either of the preceding embodiments, lure bodies can be formed of any number of resinous or plastic materials possessing sufficient flexibility. Examples include vinyls, acrylics, polyurethanes, thermoplastic elastomers, nylon, and various synthetic as well as natural rubbers. The choice of material for the lure body will depend upon the precise characteristics desired.

Lures according to the present invention can advantageously be provided in kits each including a plurality of interchangeable inserts with one or more lure bodies. Such a kit might include body 10 and inserts 18 and 18'. Another might include body 30 and two or more of inserts 44, 50 and 56. These examples are similified, and it can be seen that the advantages in terms of versatility are enhanced where more bodies and/or inserts are provided in a given kit. For example, bodies generally of the modified spoon type exemplified by body 10 and the fish type exemplified by body 30 could be adapted for use with a common set of inserts. Each kit might include one insert which is straight in the lengthwise direction so that it will support but not flex the lure body.

Numerous modifications of the exemplary embodiments shown above are possible. For example, some inserts might be provided with means for attaching the fishing line at slightly different distances from the extreme leading end. More specifically, an insert could be provided with one or more bores such as shown at 46, spaced lengthwise along the leading end of the insert and/or a plurality of raised loop type eyelets extending upwardly from the upper surface of the insert and likewise spaced along its leading end. In any event, it will be understood that the corresponding lure body would be provided with suitable openings or cutaway areas to allow access to any of the eyelets desired. Attachment of a fishing line at slightly different points, as thus permitted, provides a further means of altering the action of the lure in the water. Numerous other changes in the precise configurations of the lure bodies and inserts could be made within the spirit of the invention. Accordingly, it is intended that the scope of the invention be limited only by the claims which follow.

What is claimed is:

1. A fishing lure comprising:
   an integrally formed flexible lure body having a major lengthwise dimension and outer surfaces defining the general overall external size and configuration of said lure, said lure body comprising a central portion defining a preformed cavity extending generally lengthwise through said body, said cavity being substantially smaller than said overall external size and having a leading end and a trailing end, and said lure body having an insert opening through the exterior thereof into said cavity, said body further comprising peripheral portions adjoining said central portion and extending substantially away from said cavity in directions transverse to the lengthwise direction; and
   an insert slidably mounted in said cavity but selectively removable from said cavity through said insert opening, said insert having a leading end disposed adjacent the leading end of said cavity and a trailing end disposed adjacent the trailing end of said cavity, said insert having a configuration which is asymmetrical about a longitudinally and laterally extending plane through said leading and trailing ends of said insert and which differs from that assumed by said cavity in a relaxed condition without said insert therein, such that insertion of said insert into said cavity will cause deflection of said lure body in a direction from said leading end to said trailing end and alter the external configuration of said lure body.

2. A lure according to claim 1 wherein said insert comprises means defining an eyelet generally adjacent said leading end and means for carrying at least one fish hook adjacent said trailing end.

3. A lure according to claim 2 wherein said peripheral portions comprise a plurality of appendages adjoining lateral sides of said central portion.

4. A lure according to claim 3 wherein such insertion of said insert into said cavity causes flexing of said appendages as well as deflection of said central portion.

5. A lure according to claim 4 wherein said appendages comprise a pair of flaps extending generally lengthwise along opposite sides of said central portion.

6. A lure according to claim 5 wherein said flaps are directed laterally outwardly from said central portion in opposite directions.

7. A lure according to claim 5 wherein said flaps are directed generally tangentially from said central portion in a common direction and generally parallel to each other.

8. A lure according to claim 1 wherein said cavity is generally straight in the lengthwise direction in said relaxed condition.

9. A lure according to claim 1 wherein said insert is generally more rigid than said lure body but selectively manually malleable.

10. A lure according to claim 1 wherein said insert is comprised of a metallic material.

11. A lure according to claim 10 wherein said lure body is comprised of a resinous material.

12. A lure according to claim 1 wherein said lure body is molded.

13. A fishing lure comprising:
an integrally formed flexible lure body having a major lengthwise dimension and outer surfaces defining the general overall external size and configuration of said lure, said lure body comprising a central portion defining a preformed cavity extending generally lengthwise through said body, said cavity being substantially smaller than said overall external size and having a leading end and a trailing end, and said lure body having an insert opening through the exterior thereof into said cavity, said body further comprising peripheral portions adjoining said central portion and extending substantially away from said cavity in directions transverse to the lengthwise direction; and
an insert slidably mounted in said cavity but selectively removable from said cavity through said insert opening, said insert having a leading end disposed adjacent the leading end of said cavity and a trailing end disposed adjacent the trailing end of said cavity, said insert having a configuration which is asymmetrical about a longitudinally and laterally extending plane through said leading and trailing ends of said insert, and wherein the orientation of said insert in said cavity may be inverted about said plane, by removing, inverting, and reinserting said insert in said cavity, to alter the external configuration of said lure body.

* * * * *

UNITED STATES PATENT AND TRADEMARK OFFICE
CERTIFICATE OF CORRECTION

PATENT NO. : 4,573,283
DATED : March 4, 1986
INVENTOR(S) : Aaron J. Pippert

It is certified that error appears in the above—identified patent and that said Letters Patent is hereby corrected as shown below:

In column 9, line 8, delete "1" and insert therefor --12--.

In column 9, line 11, delete "1" and insert therefor --2--.

Signed and Sealed this

Eleventh Day of November, 1986

*Attest:*

DONALD J. QUIGG

*Attesting Officer*     *Commissioner of Patents and Trademarks*